United States Patent [19]
Pace et al.

[11] Patent Number: 5,621,590
[45] Date of Patent: Apr. 15, 1997

[54] ACTUATOR APPARATUS WITH PLASTIC C-BLOCK

[75] Inventors: Lou Pace, San Carlos; Thomas A. Tacklind, San Martin; Thomas R. Stone, San Francisco, all of Calif.

[73] Assignee: Quantum Corporation, Milpitas, Calif.

[21] Appl. No.: 621,433

[22] Filed: Mar. 25, 1996

[51] Int. Cl.⁶ .............................. G11B 5/45; G11B 21/20
[52] U.S. Cl. ............................................. 360/106; 360/104
[58] Field of Search ............................ 360/97.01, 98.01, 360/103–106

[56] References Cited

U.S. PATENT DOCUMENTS

| | | | |
|---|---|---|---|
| 5,140,481 | 8/1992 | Cain et al. | 360/104 |
| 5,153,794 | 10/1992 | Hinlein | 360/104 |
| 5,165,090 | 11/1992 | Takahashi et al. | 369/215 |
| 5,187,626 | 2/1993 | Hopkins et al. | 360/104 |
| 5,301,078 | 4/1994 | Makino et al. | 360/106 |
| 5,305,169 | 4/1994 | Anderson et al. | 360/105 |
| 5,319,512 | 6/1994 | Grapenthin | 360/106 |
| 5,382,851 | 1/1995 | Loubier | 310/13 |
| 5,444,587 | 8/1995 | Johnson et al. | 360/104 |
| 5,508,860 | 4/1996 | Takiga et al. | 360/97.01 |
| 5,523,912 | 6/1996 | Koriyama | 360/106 |
| 5,528,091 | 6/1996 | Loubier et al. | 360/106 |

FOREIGN PATENT DOCUMENTS 62-298012  12/1987  Japan .................................. 360/104

*Primary Examiner*—Jefferson Evans
*Attorney, Agent, or Firm*—David B. Harrison; Debra A. Chun

[57] ABSTRACT

An improved actuator apparatus is employed in a hard disk drive device for positioning read/write heads over tracks on a data storage disk of the disk drive. The actuator apparatus includes an all plastic C-block assembly providing the actuator apparatus with a reduced weight, lower inertia and better damping characteristic which enable improved dynamic performance. The C-block assembly includes a body portion and a pair of tapered support arms extending from the body portion in a parallel orientation. The support arms each have a suspension for a read/write head staked thereto within a mounting surface aperture at a distal end of the arm. The mounting surface aperture is configured to have a non-circular shape to facilitate staking of the read/write head to the support arm and enable construction of the C-block assembly out of plastic. The non-circular shape of the mounting surface aperture additionally enables swaging within the aperture of the plastic support without causing the plastic support arm to break or crack.

20 Claims, 6 Drawing Sheets

ACTUATOR APPARATUS WITH PLASTIC C-BLOCK

FIELD OF THE INVENTION

The present invention relates to an actuator apparatus for positioning read/write heads in a disk drive device. More particularly the present invention relates to an improved, light weight actuator apparatus having a plastic C-block.

BACKGROUND

Magnetic storage disk drive devices are commonly used in computers and data processing systems for storing information in digital form. Digital information is magnetically stored on a recording surface of the magnetic storage disk by selective magnetic polarization of regions of the surface of the disk. The surface of the magnetic storage disks is typically divided into a plurality of concentric storage tracks, where the tracks are numbered to provide addresses for accessing data on the recording surface. Data is accessed as the storage disk rotates by positioning a transducer or read/write head over the surface of the magnetic storage disk with an actuator assembly or apparatus.

Two conventional types of actuator assemblies are linear actuators and rotary actuators. A linear actuator is moved radially with respect to the surface of the magnetic storage disk by means of an actuator pulse system during track selection. A rotary actuator is rotatably mounted adjacent to the magnetic storage disk, and is moved along an arcuate path by energization of a coil placed in a magnetic field. A rotary actuator apparatus typically includes a carriage or support arm structure rotatably mounted on a hub or shaft. At one end of the support arm, a flat coil is attached and disposed relative to the magnetic field. At a distal end, the support arm includes a mounting surface, typically having an aperture, in which a suspension for a read/write head is mounted.

There are a number of known methods for mounting the read/write head to the support arm. One such commonly used method is staking, in which a staking member, typically a short tubular stem, is aligned through the mounting surface aperture and through a hole in a head suspension member. The stem of the staking member is then forcibly expanded within the mounting surface aperture of the actuator support arm by driving a ball bearing through the staking member stem. A disadvantage of the staking procedure is that it imposes limitations on the material used for the actuator support arm because the force applied during the staking procedure can cause cracking of the support arm.

Examples of other mounting methods include use of adhesives, screws and clamps. Of the known methods, staking is often used because this mounting method is purely mechanical, and easily implemented. It is only the interference between the staking member and the actuator support arm which holds them together. A disadvantage of using adhesives is that they tend to outgas over long periods of time, which can be detrimental within the interior of the disk drive device, and which can lead to reliability problems. Further, a disadvantage of using screws or clamps is that the additional hardware requires increased spacing, which can lead to additional materials and increased costs. Additionally, the screws or clamps increase the overall weight of the actuator apparatus. The increased weight of the actuator apparatus causes slower access times which are detrimental to operating performance.

As advances in technology continually increase processing speeds of the computers and data processing systems, and increase capacities of the disk drive devices while reducing costs, the actuators must likewise be improved. Fast access to the information stored on the magnetic disk requires an actuator apparatus having a low weight and low inertia with good damping characteristics and increased resonant frequencies.

Conventional actuator assemblies have a support arm or plural support arms typically formed of aluminum, magnesium, or other like metal alloys. Such metals are chosen for their properties of strength and stiffness. However, as access time has become increasingly important, some manufacturers have made the support arms out of ceramic materials, which are lighter in weight yet stiff. A problem with ceramic support arms though, is that while the ceramic materials have the property of high stiffness, they have a low tensile strength which tends to lead to cracking of the arms during the head mounting procedure. A further development has been to form the actuator arms out of a combination of metal and plastic materials, or of a plastic material. Examples of such combination actuator support arms include U.S. Pat. Nos. 5,305,169 and 5,382,851. An example of an all plastic actuator support arm is found in U.S. Pat. No. 5,165,090.

While the use of plastic materials for the actuator support arms has provided improved performance from the actuator assemblies, the existing plastic actuators have certain limitations and lack desirable properties of the metal support arms. Thus, there is restricted use of actuator assemblies with plastic support arms. A problem with the use of plastic for constructing the actuator support arm is that plastic materials typically are not stiff and strong enough to produce accurate and reliable positioning devices. Conventional actuator support arm structures are typically flat elongated components which are individually manufactured then attached to a holding member which attaches to the actuator coil, or attached directly to the actuator coil. When such actuator support arms are constructed out of a plastic material, there is a tendency for deformation of the support arm if the plastic material selected does not have a modulus of elasticity greater than a certain value. If deformation occurs, accurate positioning of the read/write head affixed to the support arm cannot be achieved.

Another problem related to the use of plastic for construction of the actuator support arm is that plastics are generally not strong enough to withstand the process of staking the read/write head to the support arm. As described above, staking is a desirable method of attaching read/write heads to an actuator support arm. However, the process of staking the read/write head to the support arm tends to exert forces resulting in tangential stresses at the mounting surface aperture. In plastic support arms, the tangential stresses are particularly problematic around a weld or knit area occurring at the distal end of the support arm. The knit area is typically a structurally weak area of the plastic support arm. Therefore, when the read/write head is ball staked in the mounting surface aperture, the tangential stresses at the knit area tend to cause the plastic support arm to crack.

An additional problem related to the desire to stake read/write heads to the actuator support arm is that existing plastic support arms do not permit a certain amount of swaging in the head mounting aperture without breakage at the tip of the support arm. When a read/write head is staked in the aperture, it is necessary that the support arm permits some swaging or deformation proximate to the aperture. The ability to permit a required amount of swaging is necessary because the staking process involves forcibly expanding a staking member within the aperture. Consequently, there must be some swaging or deformation of the aperture as the staking member is expanded therein. However, the present actuator support arms constructed out of plastic do not permit the required amount of swaging, and thus, the support arms tend to crack when the read/write heads are staked in the head mounting aperture. Since the staking process is typically performed at the end of the manufacturing process, the cracking of the support arm results in an actuator assembly which cannot be used, and results in increased manufacturing costs.

The performance of the existing actuators is thus limited by inherent properties of the above materials. Thus, there exists a hitherto unsolved need for a reliable, cost effective actuator apparatus which overcomes the problems of the prior art and which has enhanced dynamic performance.

SUMMARY

The present invention satisfies these needs. The present invention provides an improved actuator apparatus for positioning read/write heads relative to a surface of a rotating data storage disk of a hard disk drive device. The actuator apparatus is mounted on a pivot in the hard disk drive device, and is rotated about the pivot to position the read/write heads at various positions relative to the surface of the data storage disk. In a version of the present invention, an actuator apparatus includes an electrically energizable coil which is disposed relative to a magnetic field, a coil encapsulating member for supporting the coil in the magnetic field, and an integral C-block assembly formed of an electrically conductive plastic material. The C-block assembly includes a body portion having a block-like structure with a first end operatively connected to the coil encapsulating member. The body portion includes a cavity in which a hub is disposed for mounting on the pivot. From a second end of the body portion, at least one arm extends in a direction opposite the coil for supporting the read/write heads. The arm includes a head mounting surface at a distal end or tip of the arm. The head mounting surface includes a non-circular shaped aperture in which a suspension for the read/write head is attached by ball staking of the read/write head. The non-circular shape of the head mounting surface aperture reduces tangential stresses at the tip of the actuator arm to enable swaging in the aperture and facilitate ball staking of the read/write head to the plastic actuator arm without causing cracking of the plastic arm.

Additionally, an actuator apparatus having features of the present invention can include a pair of arms extending from the body portion of the C-block, and a tapered extension at the tip of each actuator arm for further reducing the tangential stresses at the tip of the arm. The actuator apparatus can further include a metallic insert in the head mounting surface aperture for providing accurate positioning and secure mounting of the read/write head.

Preferably the head mounting surface aperture is an oval shaped hole having a width greater than its length. Preferably also, the plastic C-block assembly of the actuator apparatus is injection molded such that tight dimensional tolerances are obtained. It is also preferable that the C-block assembly of the present invention is made out of a carbon and glass fiber filled plastic material. More preferably, the plastic material is a 30% carbon and glass fiber fill.

The present invention has significant advantages over the prior actuator assemblies. A first advantage is that the plastic C-block assembly of the present actuator apparatus achieves significant weight reduction and lower inertia in comparison to prior art die cast aluminum, machined C-blocks or plastic encapsulated sheet metal C-blocks. The reduced weight of the actuator apparatus enables improved dynamic performance of the actuator apparatus because the reduced weight increases system resonant frequency of the actuator. Further, the low inertia of the plastic C-block assembly also facilitates improved performance by reducing acoustic noise.

A second important advantage provided by the actuator apparatus of the present invention is significant cost reduction. The use of the plastic C-block reduces any requirements of die casting, machining or stamping operations in the manufacturing process of the actuator apparatus, thus eliminating handling and manufacturing costs related to these operations. Additionally, cost reduction is facilitated by the reduced weight and lower inertia of the plastic C-block since less magnetic material is required to achieve quick access times.

A further advantage obtained by the present invention is elimination of cracking of the support arm occurring in prior actuators from staking the read/write heads to the actuator support arm. The staking procedure inherently exerts forces resulting in tangential stresses on the support arm proximate to the tip or distal end of the arm, at an area surrounding the head mounting surface aperture, or staking hole. The present invention reduces these stresses, thus eliminating the occurrence of cracking and enabling the use of plastic materials for the entire support arm assembly.

A still further advantage realized by the present invention is that the plastic C-block can be injection molded which enables tighter dimensional tolerences in comparison to die casted parts. With the tighter dimensional tolerances, lower imbalances are obtained to produce an apparatus with increased resistance to shock and increased reliability.

BRIEF DESCRIPTION OF THE DRAWINGS

The foregoing and other objects, features and advantages of the invention will be better understood and appreciated upon consideration of the following detailed description, appended claims and accompanying drawings of preferred embodiments, where:

DETAILED DESCRIPTION

Figure 1:
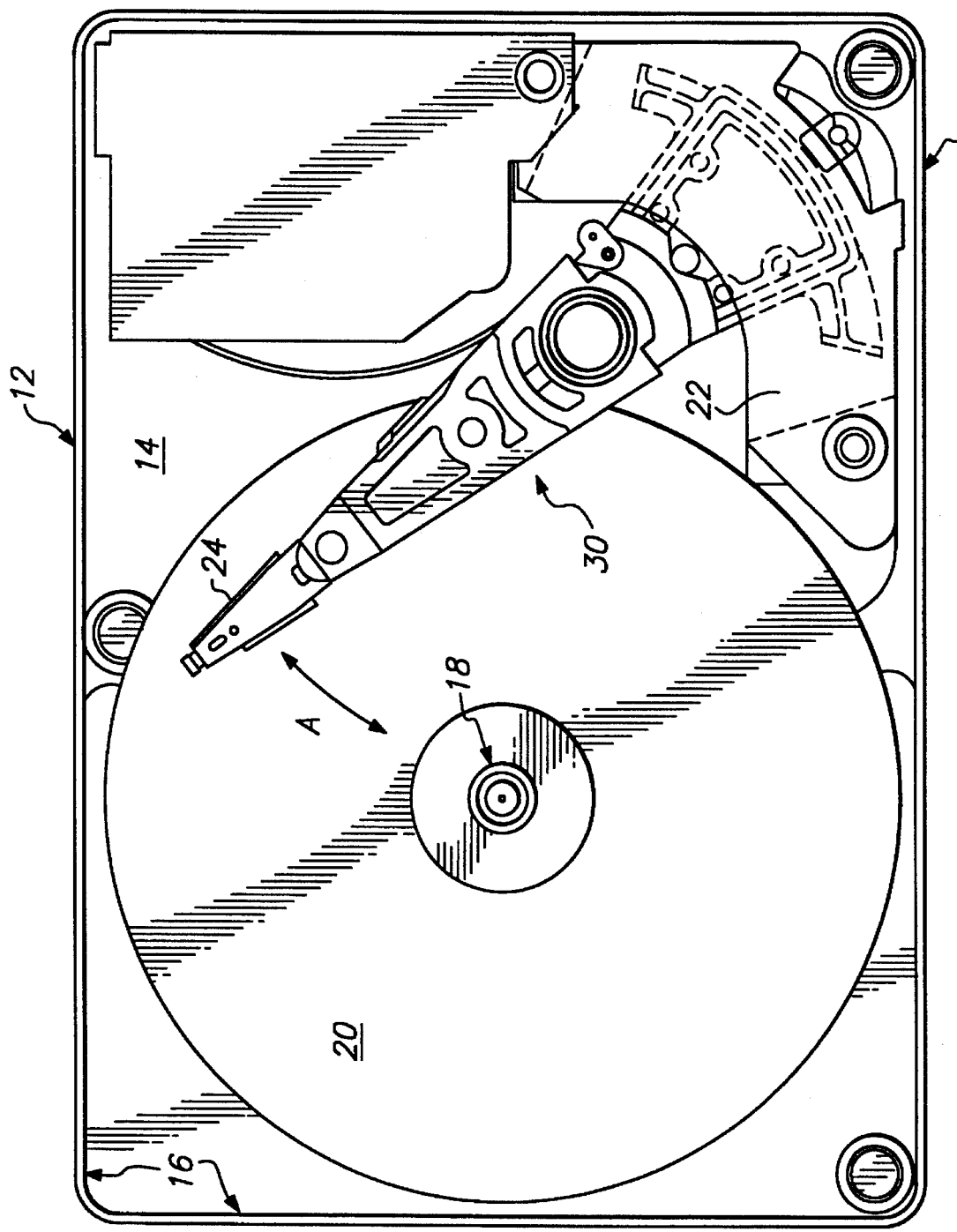
FIG. 1 is a plan view of a disk drive device which includes an actuator apparatus embodying features of the present invention.

FIG. 1 shows a disk drive device which includes an actuator apparatus incorporating principles of the present invention. Typically, a disk drive device 10 is contained in a housing 12 which includes a base 14, integrally connected sidewalls 16, and a cover (not shown). The disk drive 10 includes a spindle or hub 18 having an axis of rotation, a data storage disk 20 rotatably mounted to the spindle 18, a magnetic structure 22, and the actuator apparatus or assembly 30. Typically, a brushless spindle motor (not shown) is coupled to the spindle 18 for rotating the data storage disk 20 at a predetermined angular velocity. The spindle motor is typically integrated into the hub 18 that supports the data storage disk 20, such that the spindle motor supports and directly rotates the storage disk 20.

Typically, the surface of the disk 20 is coated, plated or deposited with a suitable magnetic material, such as ferrous oxides. However, the storage medium can also be optical, magneto-optical, and the like. The data storage disk 20 typically includes a multiplicity of magnetic storage domains, configured as concentric storage track, that may be recorded on and read back from by a transducer assembly or read/write lead 24. The transducer assembly 24, which can be any conventional, well-known combination of transducers, sliders and load beams, is positioned and supported proximate the surface of the data storage disk 20 using the actuator apparatus 30.

The actuator apparatus 30 is bidirectionally rotatably mounted to the base 14 of the housing 12. Preferably, the actuator apparatus 30 is mounted on a set of ball bearings that act as a pivot, about which the actuator 30 rotates to position the transducer 24 at different locations on the surface of the storage disk 20. The actuator apparatus 30 is caused to rotate about the pivot by a magnetic field created by the magnetic structure 22. The actuator apparatus 30 can rotate bidirectionally along a path of approximately 30 degrees, as indicated by the arrow A.

Figure 2:
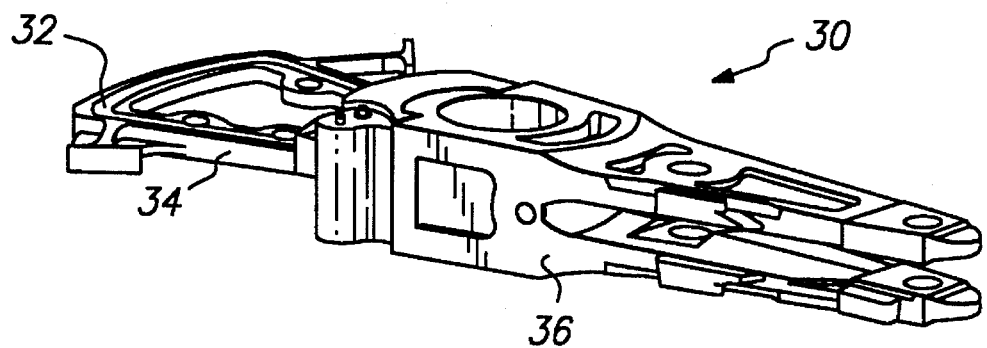
FIG. 2 is a perspective diagram of an embodiment of an actuator apparatus having features fit the present invention.
Figure 3:
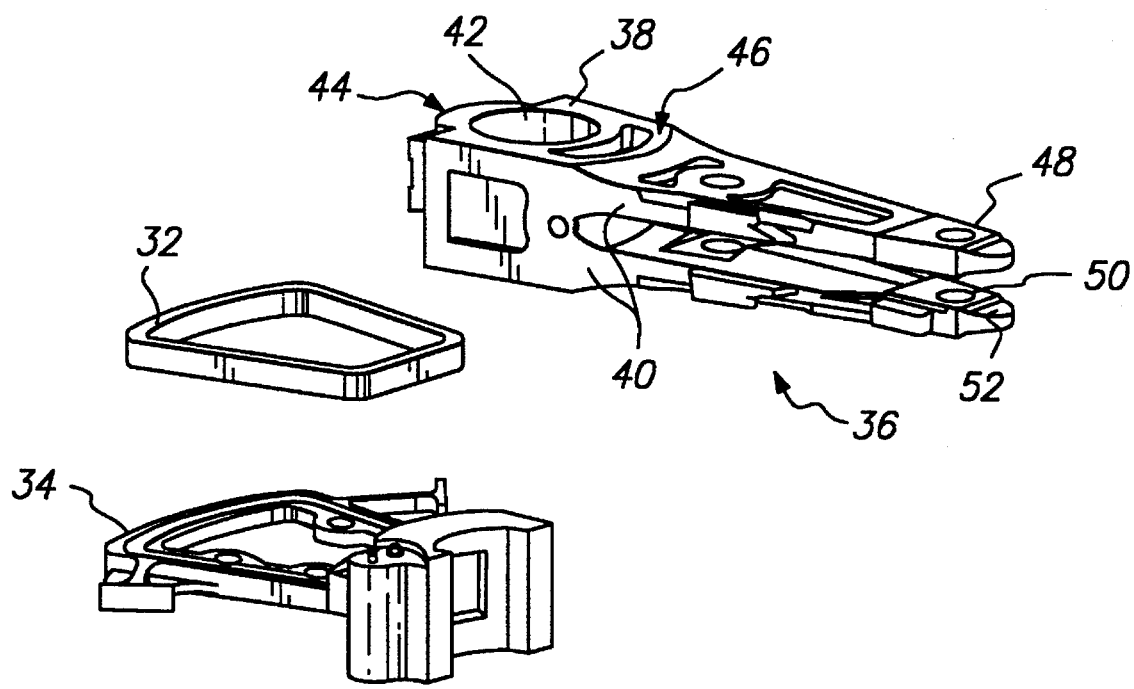
FIG. 3 is an exploded perspective diagram of the actuator apparatus shown in FIG. 2.

Referring to FIGS. 2 and 3, an actuator apparatus 30 according to an embodiment of the present invention comprises a positioning coil 32, a coil encapsulating or support member 34 and an integral plastic C-block assembly 36. The coil 32 is wound from an electrically energizable material. Preferably, the coil 32 is wound from copper or aluminum wire. The coil encapsulating member 34 provides a structure for supporting the coil 32 in a magnetic field. The coil encapsulating member 34 encompasses or surrounds the coil 32. The coil encapsulating member 34 is formed out of a polymeric, or plastic, material. Preferably, the coil encapsulating member 34 is made from an electrically non-conductive plastic such that electrical shorting of the coil 32 does not occur. Preferably, the coil encapsulating member 34 and the coil 32 are assembled together by injection molding. The coil 32 is inserted into a mold and the non-conductive plastic material is injected into the mold to form the encapsulated coil.

Figure 4:
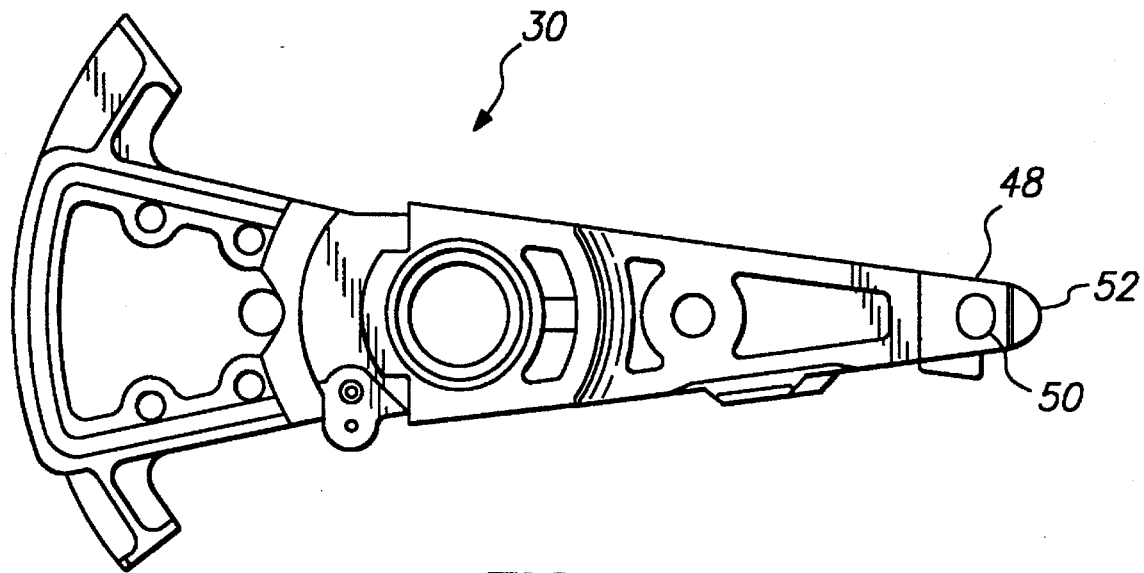
FIG. 4. is a top plan view of the actuator apparatus shown in FIG. 2.
Figure 7:
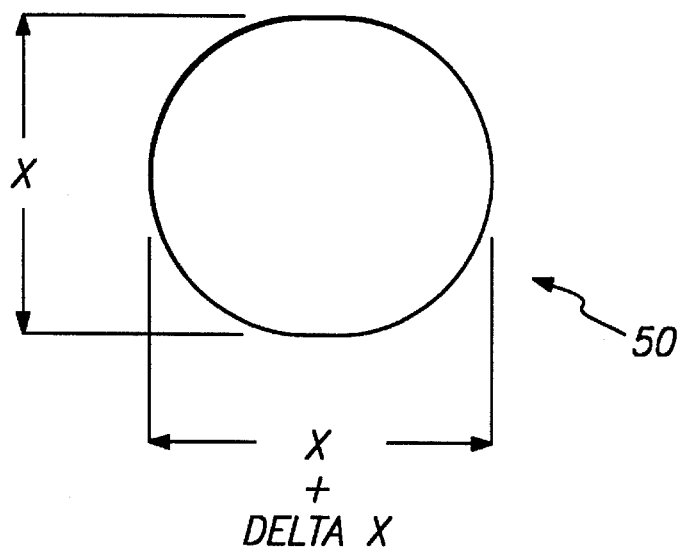
FIG. 7 is an enlarged diagram showing a head mounting surface aperture according to an embodiment of the present invention.

Referring to FIG. 3, the C-block assembly 36 includes a body portion 38 and a pair of support arms 40 extending from the body portion 38. The body portion 38 has a block-like shape with a hole or cavity 42 formed in a central portion of the body 38. The cavity 42 is used to mount the actuator apparatus 30 on the set of ball bearings attached to the base 14 of the disk drive 10. The body 38 has a first end 44 to which the coil 32 and coil encapsulating member 34 are connected, and a second end 46 from which the support arms 40 extend. In the embodiment shown, a pair of support arms 40 are illustrated, however, a C-block assembly 36 having features of the present invention could include one or a plurality of support arms 40. The support arms 40 extend from the second end 46 of the body portion 38, and are oriented parallel relative to each other and relative to the data storage disk 20. Each support arm 40 includes a head mounting surface 48 for supporting a transducer assembly or read/write head 24 (not shown here). The head mounting surface 48 is located proximate a distal end or tip of the support arm 40. The head mounting surface 48 includes an aperture 50 in which a suspension for the read/write head is mounted by a ball staking procedure. As seen in FIGS. 4 and 7, the aperture 50 has a non-circular shape such that tangential stresses at the tip of the support arm 40 resulting from the ball staking procedure are reduced.

Figure 5:
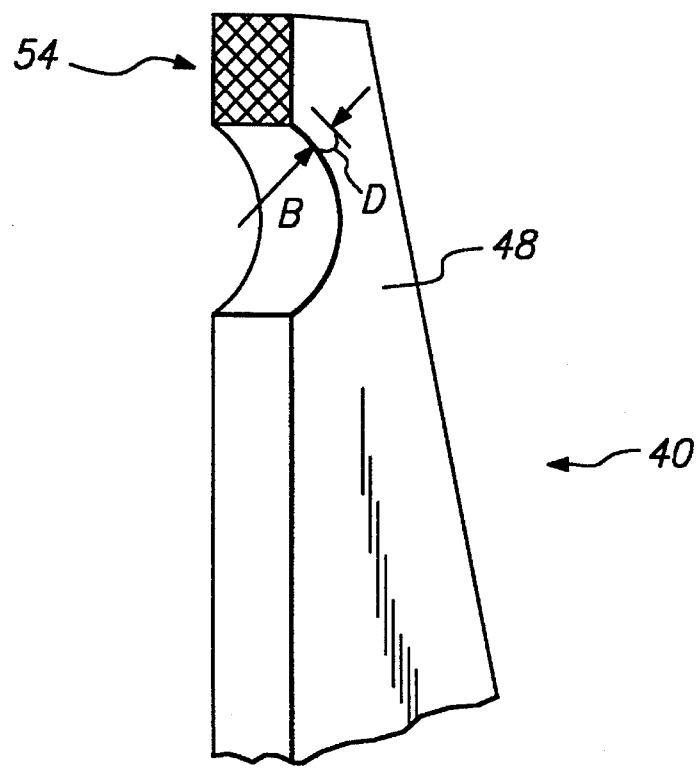
FIG. 5 is a partial cross sectional view of an actuator support arm, showing radial displacement in a head mounting surface aperture during a head staking procedure.
Figure 6A:
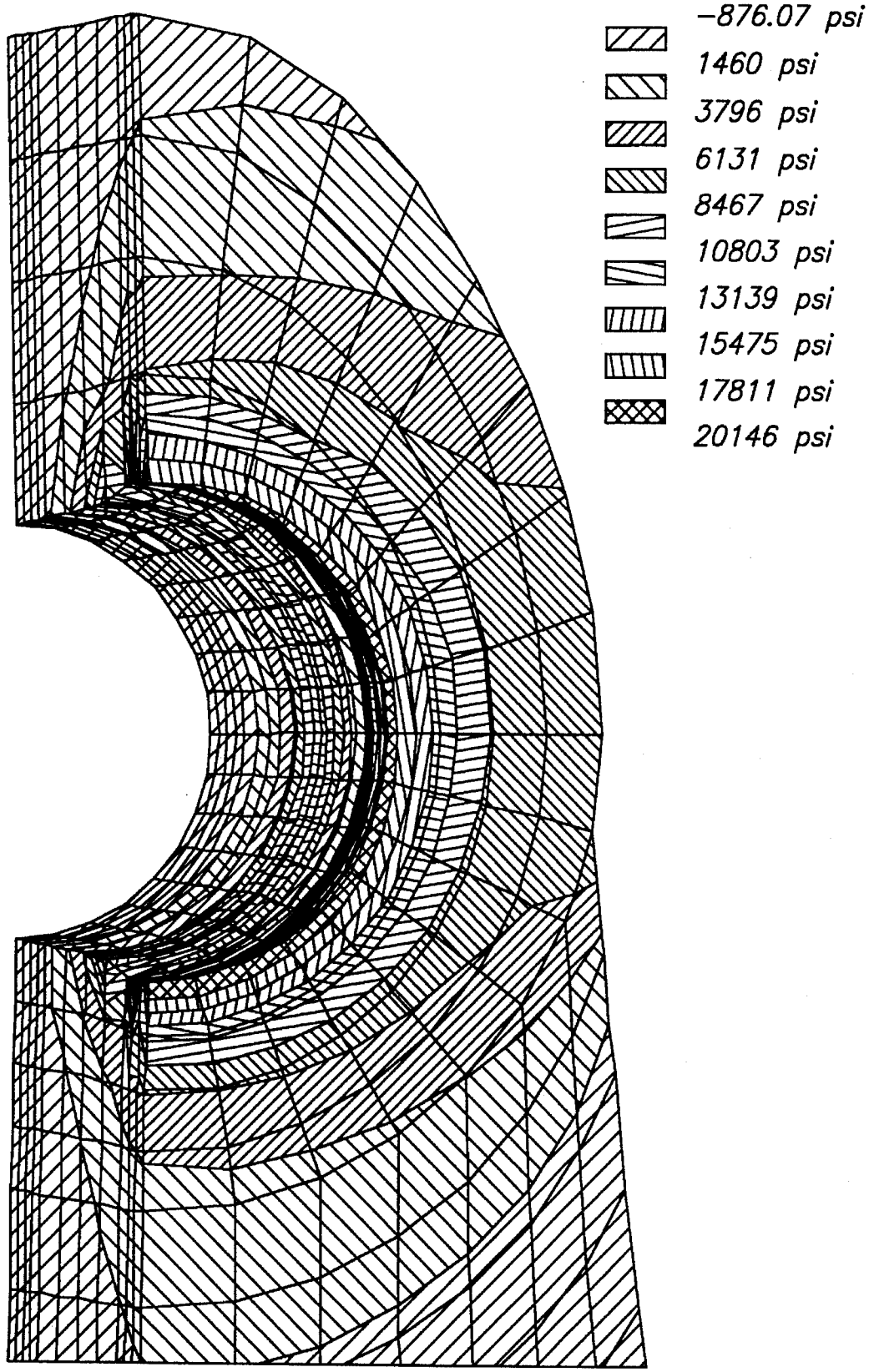
FIG. 6a is a cross sectional view of a conventional circular head mounting surface aperture, showing a distribution of stresses exerted during a head staking procedure.

The non-circular shape of the mounting surface aperture 50 is an important aspect of the present invention because it enables the all plastic C-block 36 structure. As discussed above, when a read/write head is staked, stresses are exerted within the mounting hole or aperture 50. As illustrated in FIG. 5, when the read/write head ball staked in the mounting surface aperture 50, a radial displacement, in the direction of arrow B, occurs in the aperture 50. The radial displacement in turn, exerts the stresses within the mounting surface aperture 50. In conventional actuator structures, the mounting hole has a round or circular shape, where these stresses are generally uniform about the hole, as shown in FIG. 6a. Even though the stresses are exerted uniformly about the circular hole, areas of the actuator structure around the hole are not uniformly strong. In particular, a knit area 54 located proximate the end or tip of the actuator structure 30 is generally a weak point of the actuator structure 30, such that the stresses exerted in the mounting hole 50 at the knit area 54 are more critical to performance and reliability of the actuator structure 30. A number of factors contribute to the magnitude of the stress in the knit area 54. The stress is dependent on, for example, properties of the as molded material used to form the head mounting surface 48, such as its modulus of elasticity, and Poisson's ratio. The stress exerted in the knit area 54 can also be dependent on the width and thickness of the material surrounding the knit area 54. Additionally, the stress can be dependent on factors related to the staking procedure. Examples of such factors are the radial displacement caused by swaging, geometry of the mounting surface aperature 50, geometry of the staking ball and geometry of the swage plate used to stake the head to the support arm 40.

In the conventional metal actuator structures, the metal materials used to make the actuators are typically strong, such that the uniform stresses exerted in the round hole at the tip of the actuator structure are tolerable, and do not have a substantially negative impact on the performance and reliability of the actuator structure. However, when plastic materials are used to form the prior art actuator structure, the actuator, and more particularly the knit area of the actuator arm, is not sufficiently strong enough to withstand the staking procedure within the conventional round staking hole. As a result, the prior art attempts at actuators with an all plastic C-block have been unsuccessful and unreliable due to breakage of the arm during the staking procedure, or during later use caused by weakening from the staking procedure.

Figure 6B:
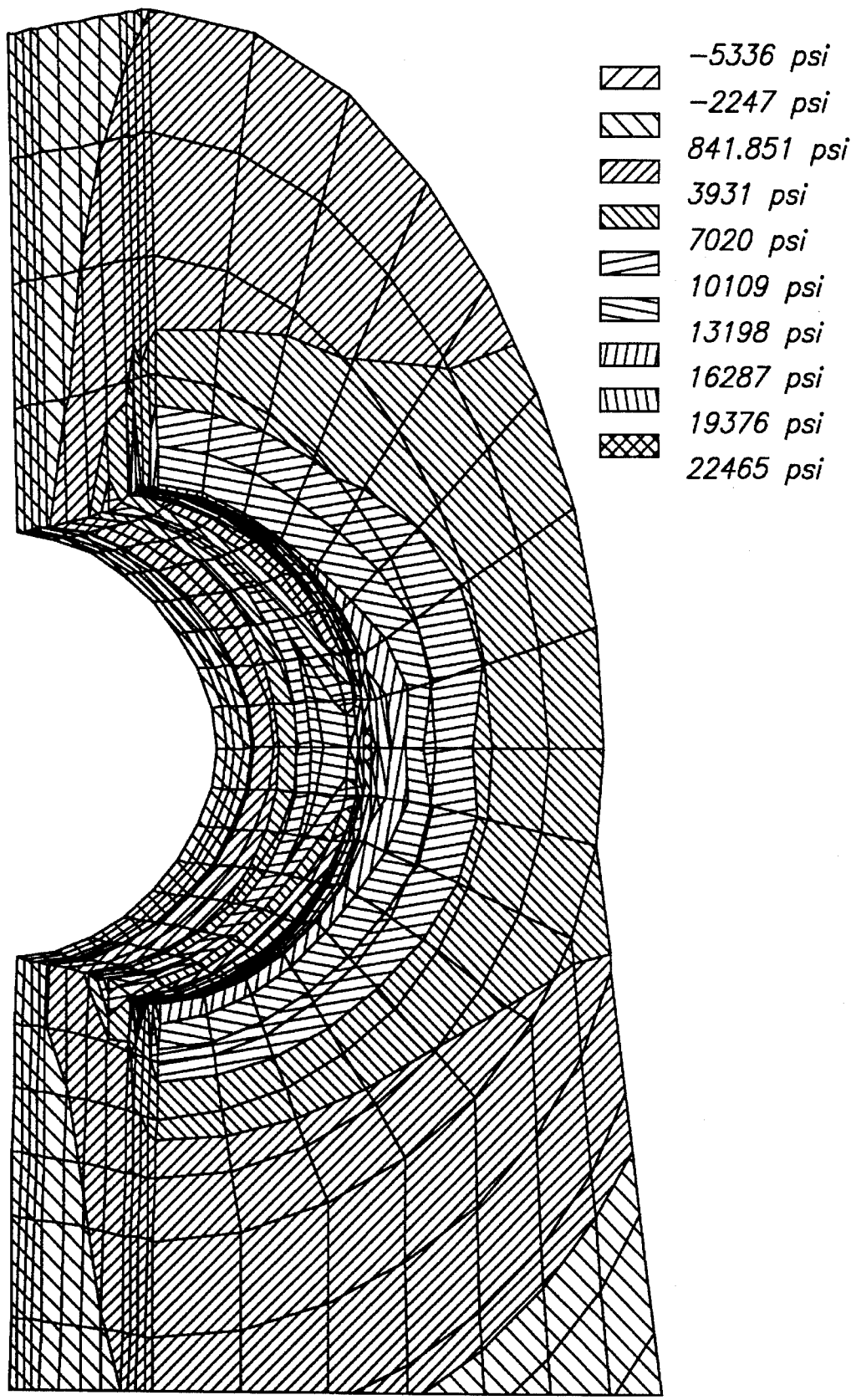
FIG. 6b is a cross sectional view of a head mounting surface aperture according to an embodiment of the present invention, showing a distribution of stresses exerted during a head staking procedure.

The mounting surface aperture 50 of the C-block assembly 36 having features of the present invention overcomes the above problems and enables a reliable plastic actuator having improved performance and a reduced cost. The problem related to the stresses exerted within the hole 50 proximate to the knit area 54 are essentially eliminated by configuring the mounting surface aperture 50 in a non-circular shape. Applicants have found that changing the shape of the mounting surface aperture 50 alters how the stresses exerted during the staking procedure are distributed. As show in FIG. 6b, when a non-circular aperture 50 is employed, the stresses are no longer uniformly distributed around the aperture 50. While the maximum stress exerted within the non-circular aperture is slightly higher than the maximum stress exerted within a circular aperture (compare FIGS. 6a and 6b), this maximum stress is limited to a relatively small area. More particularly, the overall stresses exerted within the aperture at the knit area are reduced. The reduced amount of stress in the knit area 54 results in a strong actuator support arm 40 which is tolerant to the head staking procedure, and can be molded out of plastic.

The mounting surface aperture 50 is preferably oval shaped to enable swaging without cracking the support arm 40 when the read/write head is staked. As shown in FIG. 7, the mounting surface aperture 50 is shaped such that its length (x) in the direction in which the support arm 40 extends is smaller than its width (x+delta) across the support arm 40. The difference (delta x) between the length and width of the mounting surface aperture 50 is determined by analysis or empirical test methods to ensure that adequate retention is achieved. Retention is typically determined by measuring the torque required to rotate the read/write head in the mounting surface aperture 50. This torque value is compared to the torque load incurred at shock and vibration limits of the disk drive 10. Additionally, the aperture 50 is constructed such that a maximum amount of stress in the knit area 54 is limited by a maximum amount of radial displacement D due to swaging.

In one embodiment of a C-block 36 having features of the present invention, adequate retention is achieved when the maximum radial displacement due to swaging is D=0.001 inches. When D=0.001 inches, the mounting surface aperture 50 can, for example, be constructed in an oblong configuration having a width of approximately 0.110 inches and a length of approximately 0.109 inches, where the maximum amount of stress in the knit area 54 is approximately 13,000 psi. In comparison, the maximum amount of stress in the knit area 54 for an aperture 50 with a circular configuration having a diameter of approximately 0.109 inches, is approximately 16,000 psi. Thus, the reduced amount of stress exerted at the knit area 54 for a C-block 36 according to aspects of the present invention enables a strong, reliable actuator apparatus 30 with improved dynamic performance.

The C-block assembly 36 is made from a plastic material which is preferably a high tensile strength, electrically conductive material. Preferably, the plastic has a tensile strength of about 1520 kg/cm$^2$, an elastic modulus of about 195,000 kg/cm$^2$ and an electrical resistivity within a range of about 1 to about 100 Ω-cm. By using a conductive plastic, a ground path can be established through the support arms 40 to a flex circuit connecting the actuator apparatus 30 to control and signal processing circuitry of the disk drive device 10. Additionally, the C-block assembly 36 can be made from a plastic having carbon and glass fibers for added strength. Preferably, the plastic has a 30% carbon and glass fiber fill. In a preferred embodiment, the C-block assembly is made from polyetherimide resin. However, an artisan would recognize that other plastics having similar stiffness, strength and electrical conductivity properties can be used.

The C-block assembly 36 is injection molded as a unitary structure. The C-block 36 is formed by injecting the plastic material into an injection mold. Preferably, the injection mold is configured to produce a symmetrical C-block while maintaining requirements for draft. Symmetry of the C-block is important to performance of the actuator apparatus because symmetry provides for resonance modes of the C-block to be uniform about a track centerline, thereby minimizing off track occurrences. Symmetry of the C-block is also important for facilitating uniform shrinkage during the injection molding procedure, thereby minimizing residual stresses that can cause dimensional variation. Preferably, the head mounting surface is formed by a separate core in the injection mold to improve flatness and parallelism of the head mounting surface.

The coil encapsulating member 34 and the C-block assembly 36 can be joined together in a number of ways. In one case, the C-block 36 can be molded first, then the coil 32 can be encapsulated onto a feature at the first end 44 of the C-block 36. In a second case, the coil 32 can first be encapsulated in the coil encapsulating member 34, then the C-block 36 can be molded about a feature of the coil encapsulating member 34. In still another case, the coil 32, coil encapsulating member 34 and C-block 36 can be simultaneously injection molded.

The C-block assembly 36 can further include a tapered extension 52 (identified in FIGS. 3, 4 and 8) at the tip of each support arm 40. The tapered shape of the extension 52 facilitates a reduction in stresses to improve strength at the knit or weld area 54 occurring at the tip of the support arm 40. The extension 52 can be injection molded from the plastic material used for the body portion 38 and support arms 40 of the C-block assembly 36. The extension 52 can be molded as an integral part of the C-block assembly 36. Alternatively, the extension 52 can be molded as a separate piece, then attached to the support arms 40 in a conventional manner, such as by adhesive, thermal or ultrasonic bonding, or the like.

Figure 8:
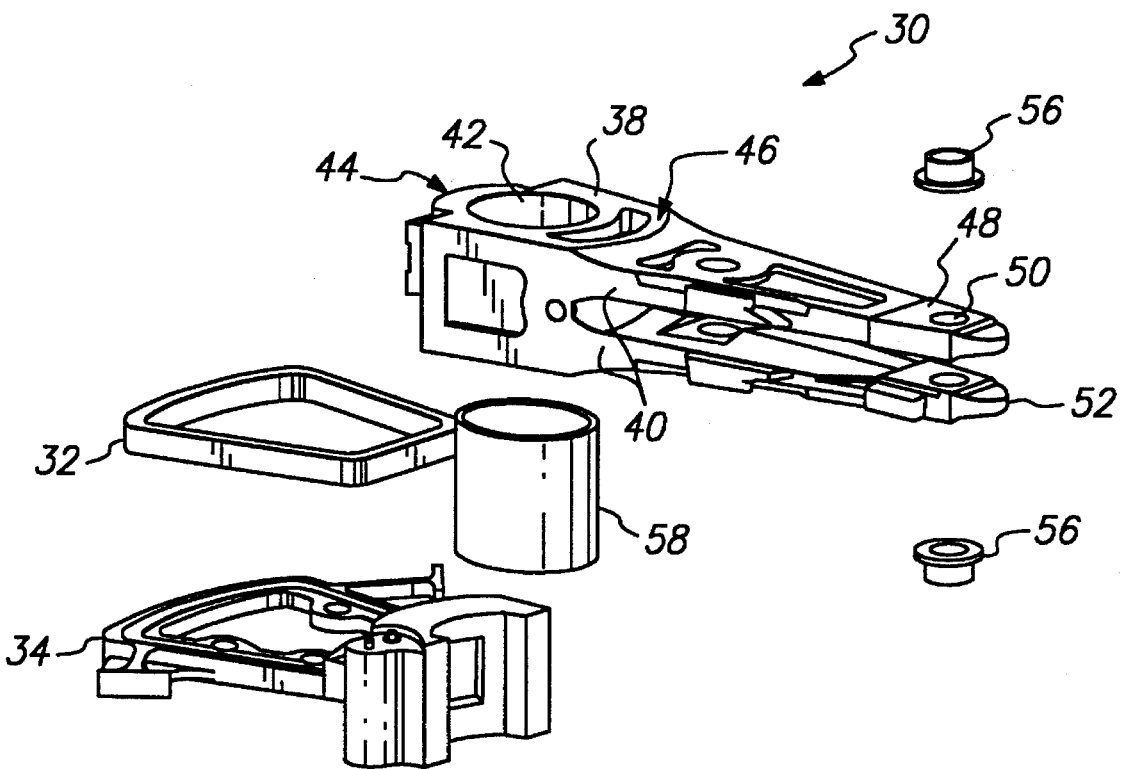
FIG. 8 is an exploded perspective diagram of another embodiment of an actuator apparatus having features of the present invention.

Referring to FIG. 8, another version of the actuator apparatus 30 includes a head staking insert 56 which is secured in the mounting surface aperture 50. The staking insert 56 provides a precise registration surface for accurately positioning and securely mounting the read/write head to the support arm 40 of the actuator apparatus 30. The staking insert 56 is a tubular structure having a circumferential shape corresponding to the shape of the mounting surface aperture 50. Preferably, the staking insert 56 is a precision machined part made from aluminum, stainless steel, brass, or other suitably strong metal material. The staking insert 56 can be insert molded during the injection molding procedure for the C-block 36. Alternatively, the staking insert 56 can be subsequently secured to the molded C-block 36 by adhesive, thermal, ultrasonic bonding or interference fitting.

The actuator apparatus 30 can further include a bearing hub 58, shown in FIG. 8, for supporting the C-block assembly 36 on the set of bearings attached to the base 14 of the housing 12. The bearings act as a pivot about which the actuator apparatus 30 rotates. The bearing hub 58 provides precise registration of the bearings and the C-block assembly 36 to facilitate accurate positioning by the actuator apparatus 30. Additionally, the bearing hub 58 enables an additional electrical grounding path from the read/write head mounted on the actuator apparatus 30 to the bearings. The bearing hub 58 is a cylindrical tube which is secured in the cavity 42 of the body portion 38 of the C-block assembly 36. Preferably the bearing hub 58 is machined from aluminum, stainless steel, brass, or any other metal material having similar strength and electrical conductivity properties. Similar to the staking insert 56, the bearing hub 58 can be insert molded during the inject molding procedure for the C-block 36. Alternatively, the bearing hub 58 can be subsequently secured to the molded C-block 36 by adhesive, thermal, ultrasonic bonding, interference fitting or other conventional bonding technique.

Referring back to FIG. 1, operation of the actuator apparatus 30 of the present invention will now be described. The actuator apparatus 30 is used in a hard disk drive device 10 in a conventional fashion. The actuator apparatus 30 positions read/write heads mounted at the ends of the C-block support arms 40 over the concentric tracks on the surface of the data storage disk 20 to read or write data from or to the data storage disk 20. The C-block assembly 36 is mounted on the set of ball bearings such that the coil 32 and coil encapsulating member 34 are positioned in a magnetic field created by the magnetic structure 22, and a current is applied to the coil 32 of the actuator apparatus 30 to electrically energize the coil 32. When the coil 32 is electrically energized in the magnetic field, a magnetic force is generated which rotates the C-block assembly 36 about the ball bearings to position the read/write head at the various tracks on the surface of the data storage disk 20.

As described hereinabove, an actuator apparatus 30 incorporating features of the present invention provides several advantages over the prior art. First, the non-circular shape of the mounting surface aperture 50 enables a plastic C-block assembly 36 to which a read/write head can be reliably staked. The ability to construct the C-block assembly 36 out of plastic leads to a second advantage of having a reduced weight which enables quicker access times. Additionally, the use of plastic to construct the C-block assembly 36 provides an actuator 30 with a lower inertia which reduces acoustic, noise to improve dynamic performance. Furthermore, the use of plastic enables a simpler manufacturing process which does not require die casting, machining or stamping operations, and thus reduces the overall manufacturing costs of the actuator apparatus 30.

While the present invention has been particularly shown and described with references to preferred embodiments thereof, it will be understood by those skilled in the art that various changes in form and detail can be made therein without departing from the spirit and scope of the invention as defined by the appended claims. The disclosures and the description herein are purely illustrative and are not intended to be in any sense limiting.

What is claimed is:

1. An improved, light weight actuator apparatus used in a disk drive device, the actuator apparatus mounted on a pivot for positioning read/write heads relative to a surface of a rotating data storage disk having a multiplicity of concentric tracks, the actuator apparatus comprising:

(a) an electrically energizable coil disposed relative to a magnetic field for positioning the read/write heads over the multiplicity of concentric tracks;

(b) a coil encapsulating member for supporting the coil in the magnetic field, the coil encapsulating member formed of a low pressure, polymeric material to avoid damage to the coil; and (c) an integral C-block assembly formed of a strong, stiff, electrically conductive polymeric material, the C-block assembly including:

(i) a body portion having a block-like structure, the body portion including a first end operatively connected to the coil encapsulating member, the portion having a cavity in which a hub is disposed for mounting on the pivot such that when the coil is electrically energized by the magnetic field, a force is created to rotate the C-block about the pivot; and (ii) at least one arm extending from a second end of the body portion for supporting the read/write heads, the arm extending in parallel relative to the surface of the data storage disk, the arm having a head mounting surface for supporting the read/write head at a distal end of the arm, the head mounting surface comprising a non-circular aperture in which a suspension for the read/write head is ball staked, the aperture shaped so that tangential stresses at the distal end of the arm induced by the ball staking of the read/write head are reduced, wherein the shape of the mounting surface aperture enables formation of the C-block assembly from a polymeric material thereby providing an actuator apparatus having reduced weight and lower inertia for improved dynamic performance and reliability.

2. The actuator apparatus of claim 1 wherein the arm further comprises a tapered extension extending from the head mounting surface, the tapered extension for further reducing the tangential stresses at the distal end of the arm.

3. The actuator apparatus of claim 1 further comprising a staking insert disposed in the aperture of the head mounting surface for accurately positioning and securely mounting the read/write head.

4. The actuator apparatus of claim 3 wherein the staking insert comprises a metal hub, the metal hub providing a precise registration surface for bearing surfaces of the read/write head suspension for accurate and secure positioning of the read/write head.

5. The actuator apparatus of claim 1 wherein the C-block assembly is injection molded such that tight dimensional tolerances are obtained for improved balancing.

6. The actuator apparatus of claim 1 wherein the head mounting surface aperture is oval shaped having a width greater than its length.

7. The actuator apparatus of claim 1 wherein the C-block is formed of a polymeric material having a modulus of elasticity at least about 195,000 kg/cm$^2$.

8. The actuator apparatus of claim 1 wherein the C-block is formed of a polymeric material with a carbon and glass fiber fill.

9. The actuator apparatus of claim 8 wherein the polymeric material is approximately 30% carbon and glass fiber fill.

10. The actuator apparatus of claim 1 wherein the C-block is formed of a polymeric material having an electrical resistivity in a range of about 1 to about 100 $\Omega$-cm.

11. An improved, light weight actuator apparatus used in a disk drive device, the actuator apparatus mounted on a pivot for positioning read/write heads relative to a surface of a rotating data storage disk having a multiplicity of concentric tracks, the actuator apparatus comprising:

(a) an electrically energizable coil disposed relative to a magnetic field for positioning the read/write heads over the multiplicity of concentric tracks;

(b) a coil encapsulating member for supporting the coil in the magnetic field, the coil encapsulating member formed of an electrically non-conductive, low pressure, polymeric material to avoid electrical shorting and damage to the coil; and (c) an integral C-block assembly formed of a strong, stiff, electrically conductive polymeric material, the C-block assembly including:

(i) a body portion having a block-like structure, the body portion including a first end operatively connected to the coil encapsulating member, the body portion having a cavity in which a hub is disposed for mounting on the pivot such that when the coil is electrically energized by the magnetic field, a force is create to rotate the C-block about the pivot; and (ii) at least one arm extending from a second end of the body portion for supporting the read/write heads, the arm extending in parallel relative to the surface of the data storage disk, the arm having a head mounting surface for supporting the read/write head at a distal end of the arm, the head mounting surface comprising an oval aperture in which a suspension for the read/write head is ball staked, the aperture shaped so that tangential stresses at the distal end of the arm induced by the ball staking of the read/write head are reduced, wherein the shape of the mounting surface aperture enables formation of the C-block assembly from a polymeric material thereby providing an actuator apparatus having reduced weight and lower inertia for improved dynamic performance and reliability.

12. The actuator apparatus of claim 11 wherein the C-block is formed of a polymeric material having a modulus of elasticity at least about 195,000 kg/m$^2$.

13. The actuator apparatus of claim 11 wherein the C-block is formed of a polymeric material with a carbon and glass fiber fill.

14. The actuator apparatus of claim 13 wherein the polymeric material is approximately 30% carbon and glass fiber fill.

15. The actuator apparatus of claim 11 wherein the C-block is formed of a polymeric material having an electrical resistivity in a range of about 1 to about 100 $\Omega$-cm.

16. An improved, light weight actuator apparatus used in a disk drive device, the actuator apparatus mounted on a pivot for positioning read/write heads relative to a surface of a rotating data storage disk having a multiplicity of concentric tracks, the actuator apparatus comprising:

(a) an electrically energizable coil disposed relative to a magnetic field for positioning the read/write heads over the multiplicity of concentric tracks;

(b) a coil encapsulating member for supporting the coil in the magnetic field, the coil encapsulating member formed of an electrically non-conductive, low pressure, polymeric material to avoid electrical shorting and damage to the coil;

(c) a metallic hub for mounting on the pivot; and (d) an integral C-block assembly formed of a strong, stiff, electrically conductive polymeric material, the C-block assembly including:

(i) a body portion having a block-like structure, the body portion including a first end operatively connected to the coil encapsulating member, the body portion having a cavity in which the hub is disposed for mounting the C-block assembly on the pivot such that when the coil is electrically energized by the magnetic field, a force is created to rotate the C-block about the pivot; and (ii) a pair of arms extending from a second end of the body portion for supporting the read/write heads, the arms extending in parallel relative to each other and relative to the surface of the data storage disk, each arm having a head mounting surface for supporting the read/write head at a distal end of the arm, the head mounting surface comprising an oval aperture in which a suspension for the read/write head is ball staked, the aperture shaped so that tangential stresses at the distal end of the arm induced by the ball staking of the read/write head are reduced, wherein the shape of the mounting surface aperture enables formation of the C-block assembly from a polymeric material thereby providing an actuator apparatus having reduced weight and lower inertia for improved dynamic performance and reliability.

17. The actuator apparatus of claim 16 wherein the C-block is formed of a polymeric material having a modulus of elasticity at least about 195,000 kg/m$^2$.

18. The actuator apparatus of claim 16 wherein the C-block is formed of a polymeric material with a carbon and glass fiber fill.

19. The actuator apparatus of claim 18 wherein the polymeric material is approximately 30% carbon and glass fiber fill.

20. The actuator apparatus of claim 16 wherein the C-block is formed of a polymeric material having an electrical resistivity in a range of about 1 to about 100 $\Omega$-cm.

* * * * *